US007664049B1

(12) United States Patent
Arrakoski et al.

(10) Patent No.: US 7,664,049 B1
(45) Date of Patent: *Feb. 16, 2010

(54) MULTILAYER TELECOMMUNICATIONS NETWORK

(75) Inventors: Jori Arrakoski, Espoo (FI); Ari Leppa, Espoo (FI); Nico Van Waes, Espoo (FI)

(73) Assignee: Nokia Corporation, Espoo (FI)

( * ) Notice: Subject to any disclaimer, the term of this patent is extended or adjusted under 35 U.S.C. 154(b) by 920 days.

This patent is subject to a terminal disclaimer.

(21) Appl. No.: 10/089,326

(22) PCT Filed: Sep. 27, 2000

(86) PCT No.: PCT/IB00/01434

§ 371 (c)(1),
(2), (4) Date: Dec. 9, 2002

(87) PCT Pub. No.: WO01/24453

PCT Pub. Date: Apr. 5, 2001

(30) Foreign Application Priority Data

Sep. 29, 1999 (GB) .................................. 9923070.8

(51) Int. Cl.
*H04L 12/28* (2006.01)
*H04W 4/00* (2009.01)
(52) U.S. Cl. ....................................... 370/254; 370/338
(58) Field of Classification Search .................. None
See application file for complete search history.

(56) References Cited

U.S. PATENT DOCUMENTS 5,325,362 A    6/1994  Aziz .......................... 370/94.3
5,664,007 A *  9/1997  Samadi et al. ............... 455/442
5,832,384 A    11/1998 Balachandran et al. ....... 455/450
5,960,354 A    9/1999  Einola ......................... 455/454
6,137,802 A    10/2000 Jones et al. .................. 370/401
6,185,413 B1 * 2/2001  Mueller et al. .............. 455/405
6,219,346 B1   4/2001  Maxemchu ................. 370/338
6,304,556 B1 * 10/2001 Haas .......................... 370/254

(Continued)

FOREIGN PATENT DOCUMENTS

| EP | 0 769 885 A1 | 4/1997 |
| WO | WO 96/35310 | 11/1996 |
| WO | WO 97/04610 | 2/1997 |
| WO | WO 98/27748 | 6/1998 |
| WO | WO 99/43165 | 8/1999 |

OTHER PUBLICATIONS

Office Action dated May 22, 2008 in U.S. Appl. No. 09/833,868.

(Continued)

*Primary Examiner*—Hong Cho
*Assistant Examiner*—Robert C Scheibel
(74) *Attorney, Agent, or Firm*—Alston & Bird LLP

(57) ABSTRACT

A communications system comprising: a first network comprising a plurality of first network subscriber units and a first network sink node unit capable of wireless communication with the first network subscriber units; and a second network geographically at least partly overlapping the first network and comprising a plurality of second network subscriber units and a second network sink node unit capable of wireless communication with the second network subscriber units; and a dedicated connection between the first network sink node unit and a second network unit capable of communication in the second network, whereby a first network subscriber unit may be provided with a communication path to another second network unit.

41 Claims, 7 Drawing Sheets

U.S. PATENT DOCUMENTS

| | | | |
|---|---|---|---|
| 6,349,091 B1 | 2/2002 | Li | 370/238 |
| 6,418,138 B1 | 7/2002 | Cerf et al. | 370/352 |
| 6,456,600 B1 | 9/2002 | Rochberger et al. | 370/255 |
| 6,751,455 B1 * | 6/2004 | Acampora | 455/414.1 |
| 6,980,537 B1 * | 12/2005 | Liu | 370/338 |

OTHER PUBLICATIONS

Office Action dated Dec. 27, 2007 in U.S. Appl. No. 09/833,868.
Office Action dated Jun. 15, 2007 in U.S. Appl. No. 09/833,868.
Office Action dated May 25, 2007 in U.S. Appl. No. 09/833,868.
Office Action dated Nov. 20, 2006 in U.S. Appl. No. 09/833,868.
Office Action dated Aug. 23, 2006 in U.S. Appl. No. 09/833,868.
Office Action dated Feb. 13, 2006 in U.S. Appl. No. 09/833,868.
Office Action dated Jul. 13, 2005 in U.S. Appl. No. 09/833,868.
Office Action dated Nov. 10, 2004 in U.S. Appl. No. 09/833,868.
U.S. Appl. No. 60/164,942, filed Nov. 12, 1999.
U.S. Appl. No. 60/164,955, filed Nov. 12, 1999.
U.S. Appl. No. 60/164,941, filed Nov. 12, 1999.
Office Action dated Nov. 30, 2008 in U.S. Appl. No. 09/833,868.
Office Action dated Feb. 25, 2009 in U.S. Appl. No. 09/833,868.

* cited by examiner

MULTILAYER TELECOMMUNICATIONS NETWORK

This invention relates to a multilayer telecommunications network.

A wireless telecommunications network conventionally comprises a plurality of subscriber terminals such as mobile phones or wireless local loop terminators which can each communicate with one or more nearby base stations. Each base station is connected to a base station controller or another network element connecting the base station to the rest of the network by a relatively high bandwidth connection such as a cable or fibre link. Each base station controller is connected to a number of base stations. The base station controllers are connected to other network equipment, and by means of that equipment to other networks. In this way a connection can be established from one subscriber terminal to another or to a terminal in one of the other networks.

This arrangement has a number of disadvantages. First, it is necessary to implement all levels of the network in order to provide any connectivity for subscriber terminals. Second, all subscriber terminals use a similar link to a base station, and therefore it is not possible to offer subscriber terminals that can communicate at significantly enhanced data rates. Third, the hierarchical nature of the network-side connections to each base station mean that it is relatively inconvenient to alter the deployment of base-stations.

A fully wired connectivity concept is currently being deployed for many applications, for example using low speed telephone modems, DSL technologies, ISDN, cable modems, fibre etc. However, with current non-DSL technology the available throughput is relatively low for many intensive applications. DSL throughput is often degraded due to insufficient backhaul capacity and excessive traffic bundling. Also, DSL is often limited to urban scenarios due to the strict distance limitations.

The advantage of the proposed wireless solution over cable modems lies mainly in the excessive wiring costs required to provide cable modems. On top of that, wired solutions need to be fully deployed before any service can be offered, which requires a huge investment. The proposed wireless solution is scalable and can be tailored to the short-term demand and expanded with low cost when necessary. For fibre networks, the same holds as for cable modems.

Wireless solutions include satellite systems, WLL, advanced cellular networks, WLAN and LMDS based solutions. For satellite systems, two configurations are in use, one using both uplink and downlink through the satellite, while the other uses the satellite only for downlink. The clear disadvantage of both these configurations is the huge deployment cost. Another drawback is the high delay and the limited available throughput. However, the system does have the advantage of good coverage. WLL solutions are mainly intended for wireline replacement thus providing suitable bit rates for speech. This is a clear disadvantage compared to the proposed system, though the most advanced WLL systems try to achieve higher bit rates. Cellular networks provide mobility with a low throughput. The deployment costs are higher than for the proposed system. Operation of the cellular networks is licensed and highly regulated, thus limiting the business to just a few operators per area. WLAN support is partly included in the proposed system. A plain WLAN system has the limitations of a very small cell size thus requiring a huge amount of base stations for building coverage. The base station deployment is costly due to the fact that every base station must be connected to the wired network, thus requiring costly new wiring. This problem can be addressed with the proposed inband transmission (AMT).

Another one tier wireless solution is a fully PMP (LMDS) network. The main advantage the proposed network has over this solution, is that it does not suffer from the stringent LOS requirements of this type of solution, and that the CPE devices for low-demand customer premises will be far less expensive due to the lower cost of the RF part.

The proposed ETSI Broadband Radio Access Networks (BRAN) system is a multi level system. The architecture proposed for the BRAN system is shown in FIG. 1. HiperLink links are high bandwidth radio links for static interconnections, for example for use as access points into a fully wireless network. HiperAccess links are moderate speed radio access links for fixed radio connections to, for example, customer premises. HiperLAN/2 links provide moderate speed radio communications between, for example, portable computing devices and broadband networks. As shown in FIG. 1, one unit may be linked to another by, in series a HiperAccess link, a HiperLAN link and a HiperLink. This system provides a range of link speeds for appropriate environments, but relatively little flexibility of implementation since the network architecture at each level is a conventional, hierarchical tree structure.

According to the present invention from one aspect there is provided

The present invention will now be described by way of example with reference to the accompanying drawings in which.

An example of a telecommunications network according to the present invention will now be described in detail. The network comprises several tiers or layers having different operational characteristics, and between which communication can take place.

Figure 1:
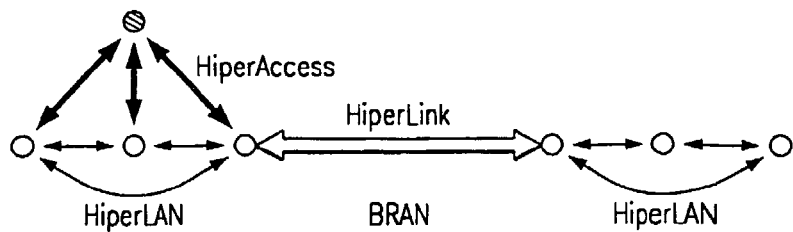
FIG. 1 shows schematically the architecture of the proposed BRAN system.
Figure 2:
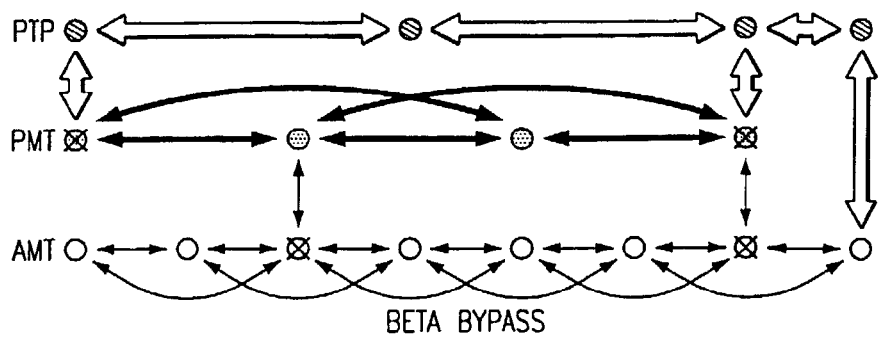
FIG. 2 shows schematically the architecture of a system according to one aspect of the present invention.

The network is illustrated generally in FIG. 2. The network comprises a PTP tier (PTP), a pre-configured mesh tier (PMT) and an ad-hoc mesh tier (AMT). Nodes in each layer may act as effectively as terminals or as sink nodes which can communicate with more or more terminals. A sink node in one layer can also have a presence as a sink node or a terminal in a higher tier, providing a link between the layers. Each tier operates in a different frequency band so that signals in each tier can be sent and received independently of those in other tiers even though the coverage areas of the networks overlap. A subscriber to the network can be provided with a terminal operable in which ever tier is most appropriate. A low bandwidth user can be provided with a terminal in the AMT tier; a higher bandwidth user can be provided with a terminal in the intermediate (PMT) layer; a high bandwidth user can be provided with a terminal in the upper (PTP) layer. It may also be possible for terminals in each layer to communicate directly with each other, without the use of a sink node as intermediary.

It is significant that each tier can "fit seamlessly", in terms of connectivity and interference avoidance, in the multi-tiered architecture. But tiers are preferably not interoperable because, for example, they may each operate in a different frequency band. This would avoid inter-tier interference.

In comparison, previously disclosed networks typically consist of one tier only, which neither provide scalability nor are designed with lower or higher wireless network tiers in mind.

As will be described in more detail below, further network tiers (for example WLANs or PANs) may be attached on top of or below the network of FIG. 2. These further tiers may operate within the same frequency band, CCA may be employed to allow for graceful coexistence within such a frequency band. It is preferred that devices meant for operation in the Ad-hoc Mesh Tier will be capable of interoperability with WLANs. This would allow such devices to be able to switch operation from one tier into the other.

The word "connectivity" refers to the possibility to connect co-located devices from different tiers back to back. The word "interoperability" refers to the capability of a device made to function in one tier in a certain mode, to function in another tier in that same mode.

A multi-tiered architecture of the type shown in FIG. 2 can provide flexible and scalable network deployment, which provides high cost-efficiency. Especially in the mesh architecture of the lowest tier, increasing the throughput can easily be achieved by inserting only a new node into the tier above, without manual reconfiguration of any other devices. In contrast, in a one-tier approach increasing bandwidth demand often can only be met by a total reconfiguration of the whole (sub)-network. This flexibility and scalability can give a network operator the ability to start the network small and extend it as demand increases, whereas other networks generally need to be fully pre-deployed (e.g. wired networks), or pre-deployed to a large extent to avoid the huge cost of network extension (e.g. one-tier wireless approaches).

A multi-tiered architecture can also avoids the need for a trade-off between technology cost and performance demands. For a one-tiered network, for example a network in the LMDS band, throughput can be made adequate throughout the network, but the cost of a CPE is high due to the high cost of RF-technology in this band. For a one-tiered network in the 2.4 GHz band, for example, the CPE cost is comparatively much lower, however, the achievable throughput (with current technology) is lacking. The multi-tiered approach described herein can provides the advantages of both prior art techniques, while avoiding the drawbacks set out above.

The physical layer of the Ad-hoc Mesh Tier (AMT) can suitably be based on existing WLAN standards. (See, for example IEEE Std 802.11-1999, IEEE Std 802.11a/D6.0 and IEEE Std 802.11b/D5.5). This technology is not sufficient to handle all cases in the outdoor environment. Improvements are therefore needed. The enhancements described below will among other things aid in extending communication range and improving interference and error resilience, thereby increasing system capacity.

Since the physical layer of the AMT has similar RF characteristics to a WLAN, interoperability can be achieved purely by additional software. For example, if an AMT device has an indoor antenna, it could additionally serve as WLAN base-station, for example on a time-sharing basis.

On the link/network layer level, the presently proposed solution is potentially superior in that it does not require the concept of base-stations (master/slave approach), resulting in higher flexibility and failure resistance. Also, it does not demand the thorough network planning required for WLAN networks with multiple base-stations. This can be achieved by inband trunking and real-time adaptive network configuration. The link layer protocols will also decrease the systems self-interference.

The system described herein also implicitly handles the hidden terminal problem, whereas this poses significant scheduling problems in the WLAN approach; and can be optimised for both mobile and fixed terminals, by means of the system design being well adapted to conserving mobile baftery-life.

Compared to a classical PMP topology, the PMT tier described herein can offer a higher reliability due to the possibility to connect a node to multiple others, and indirectly to multiple sink-nodes. Another potential advantage of the PMT tier is that not all nodes need to fulfil the LOS or near-LOS requirement to the sink-node, as LOS or near-LOS to any other node which achieves, directly or indirectly, LOS or near-LOS to the sink can be sufficient. Hence the PMT solution relaxes the stringent PMP requirements on base-station placement.

The present system will now be described in more detail.

Figure 3:
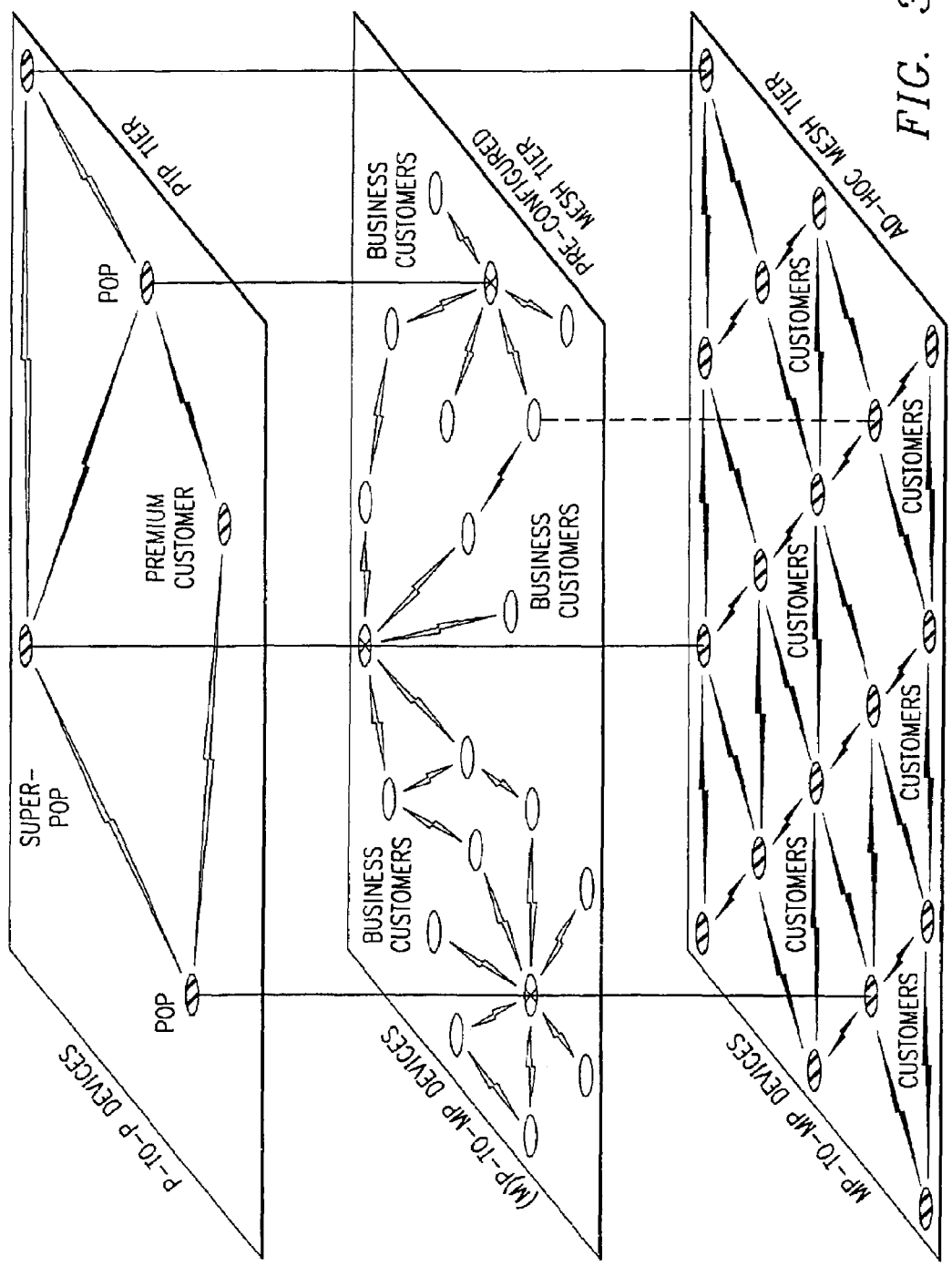
FIG. 3 shows in more detail the system of FIG. 2.

The present system has a tiered network architecture, as illustrated generally in FIGS. 2 and 3, comprising a PTP tier, a pre-configured mesh tier (PMT) and an ad-hoc mesh tier (AMT). In general, the AMT may be considered as being principally for residential and SOHO access (Customers), and the Pre-configured Mesh Tier (PMT) for AMT traffic transport and customers with high bandwidth demand (Business Customers). The PTP Tier serves to either connect single extremely high bandwidth demanding customers (Premium Customer) and PMT hubs directly to the backbone network.

Any of the three tiers can be deployed separately, while combinations are also possible. Thus the right combinations of the basic building elements can fulfil a multitude of service provider demands and requests. Suggested combinations appropriate to certain common scenarios are set out below.

The present network is principally adapted for outdoors use, and for deployment to cover relatively short distances to subscriber equipment rather than for long-distance trunk use (i.e. an outdoors last miles solution). It hence does not target same markets as WLANs and PANs, which are typically indoor solutions. In a suitable implementation the present network may provide a seamless wireless backhaul solution for the aforementioned technologies, in combination with which a wireless solution from, for example, a PCMCIA card may be implemented all the way to an ISP's POP. Even though they are not shown in FIG. 3, WLANs and PANs can henceforth be considered to be optionally present as additional tiers underneath the AMT in FIG. 3.

The network comprises of three tiers: AMT, PMT and the PTP Tier.

A mesh network is built around sink nodes by adding mesh nodes. Sinks located in the area covered by one sink become connected on the mesh tier when a path of mesh nodes is available between them. In this mesh network the traffic flows from one node to another seeking the optimal route to the receiver. Though, the major part of the traffic tends to come or go to the Internet outside the radio network. Thus the traffic flow in a mesh network will be mainly from and towards sinks.

Both the AMT and PMT are mesh configurations. The AMT configuration is ad-hoc, meaning that devices may appear randomly and establish links to their geographical neighbours, thus mobile devices are supported though limitations exist to the communication during movement. The PMT configuration, in contrast, is the result of network planning. In the PMT, the devices are preferably stationary and their connections preferably fixed.

Figure 4:
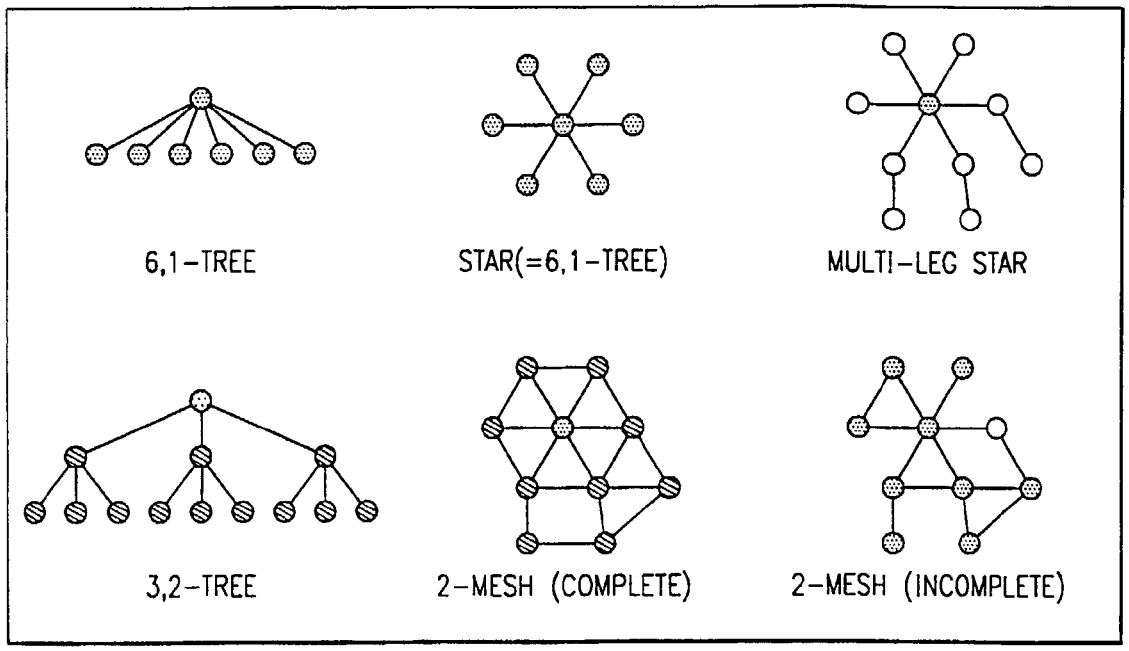
FIG. 4 shows mesh and mesh derived network topology examples.

The PMT connects the AMT sinks. The PMT itself has its own sinks, which are either fixed wired backbone or PTP tier connections (see FIG. 3). The PMT is a mesh topology, but it may be implemented as any mesh derivative (see FIG. 4). LOS or the like might normally be required at this tier.

A multi-leg star topology differs from a star topology in that it allows a node to be indirectly connected to the sink (centre) node through a maximum of one other node, whereas a star topology requires each node to be directly connected to the sink. It differs from a pure mesh topology in that a pure mesh allows a node to connect to a sink through multiple hops. A multi-leg star allows usage of repeater stations to pass by obstructing objects.

The PTP tier comprises high-capacity LOS links, which serve primarily as backhaul links for the PMT and as access points for customers with extremely high bandwidth demands.

Figure 5:
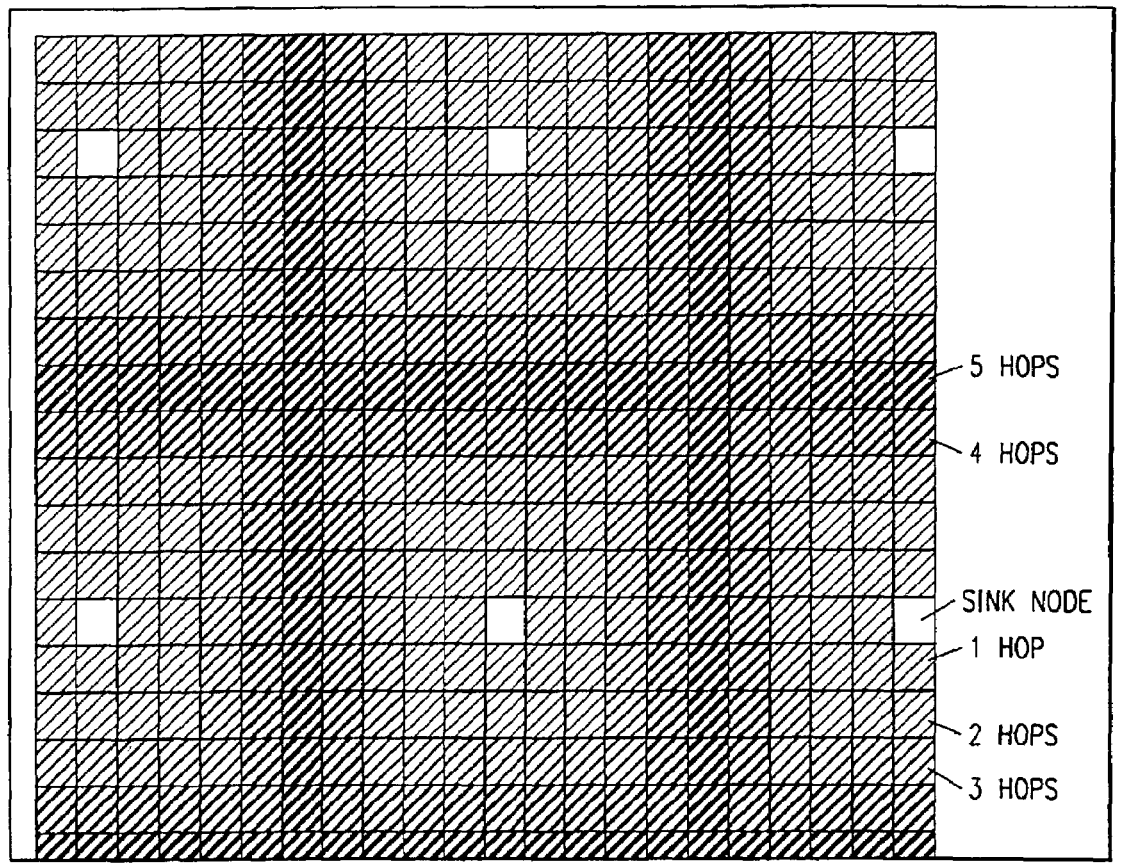
FIG. 5 shows a square grid of nodes illustrating hops in the present system.

For purposes of modelling, the mesh nodes can be assumed to be distributed evenly in a square grid (see FIG. 5). With a maximum hop of four, there will be 64 cells per a sink (including the sink). With five, the corresponding value is 100. Note that it is assumed that the border nodes (cells) are shared with the neighbouring sinks' border nodes. Thus the total amount of nodes are 64 and 100 and not 81 and 121. The traffic generated at the sink is not by definition using the mesh network, and thus the effective node counts will be 63 and 99. The corresponding numbers for a traditional cellular network geometry, the hexagonal grid, is 47 and 74 respectively.

For the PMT tier, the maximum number of connections per node will be limited due to the fact that to connect to most nodes, the node will require another antenna. This restriction does not hold for the sink-node, the sectors of which will have to cover 360 degrees For the purpose only of clarification and example of a capacity study for the AMT will now be considered. With an average customer throughput of, say, 200 kbit/s a sink will gather 12.6 Mbit/s (4 hops) and 19.8 Mbit/s (5 hops). Although this average rate may appear low, the bursty nature of typical traffic could make the instantaneous throughput at least an order of magnitude higher. If two radios will share the load at the sink, the capacity that each hop in the sink tier must be able to handle becomes $\frac{1}{2} \times 19.8$ Mbit/s≈10 Mbit/s. This is the maximum required AMT radio throughput. The maximum number of hops allowed will hence be limited by the available link capacity. The minimum total capacity needed for the AMT and PMT can't be computed by simply multiplying the number of nodes with the desired minimum capacity per node, because each hop consumes a share of the total network capacity. The more hops a data packet make the more capacity is consumed. On average there are 2.73 hops per customer in the 4-hop case, and 3.38 hops in the 5-hop case.

4 hops: $(8 \times 1 + 16 \times 2 + 24 \times 3 + 15 \times 4)/63 = 172/63 = 2.73$
5 hops: $(8 \times 1 + 16 \times 2 + 24 \times 3 + 32 \times 4 + 19 \times 5)/99 = 335/99 = 3.38$ Thus traffic flowing to the sink will require a capacity of $2.73 \times 12.6$ Mbit/s=34.3 Mbit/s (4 hops) and $3.38 \times 19.8$ Mbit/s=66.9 Mbit/s (5 hops). The capacity factor using 5 hops compared to 4 is $2.73/3/38 = 0.80$ (or $34.3/66.9 \times 100/64$), while the factor of sinks necessary is 0.64. (i.e. the capacity is reduced by 20%, but there are 36% fewer sinks required).

The various network tier combinations and their applications will now be described. Five classes of environmental conditions are considered: dense urban, urban, semi-urban, semi-rural and rural. Sub-classes for these can be defined on a global scale to reflect local variations.

EXAMPLE DEFINITIONS

Dense Urban: City centre, 4+ story buildings, and no open space between buildings except streets. Building efficiency (defined as the ratio between the sum of the total floor area (including the walls) and the land area being used) exceeds 1.00.

Urban: Area around city centre, 24 story buildings, some open space between buildings may exist. Building efficiency between 0.50-1.00.

Semi-Urban: City centre of small city, 1-3-story buildings, fair amount of open space around buildings. Building efficiency 0.30-0.50

Semi-Rural: Single family housing area, 1-2-story buildings, lots of empty space between, sight possibly restricted by trees & fences. Building efficiency 0.10-0.30.

Rural: Buildings make up a minimal part of the area. Building efficiency less than 0.10 (normally a lot less).

Utilization scenarios for these five different environments are introduced below. Obviously any combination is available in any case, but business case parameters and economics are likely to favour some combinations over others. Thus one of the key issues of flexible network deployment can be handled by choosing the appropriate network elements.

The dense urban area is a difficult radio environment especially if LOS is required. In downtown areas business penetration is typically relatively high. Thus capacity demands become fairly high. LOS is required for this high capacity, but it is laborious to arrange, and thus the wireless solution has severe drawbacks in this environment. Nevertheless, PTP tier radios can be used to cost efficiently connect office buildings. The AMT can be used to offer service for mobile users.

Urban areas offer the highest probable customer density with a useful radio environment. Here the full concept can be utilized, as the probability for LOS is much higher than in the dense urban case. In the case that the capacity required by the customers is low, then the PTP tier can be omitted.

Semi-urban areas are most suitably handled by the AMT for access and the PMT for transport. If higher capacities are required and the distances are suitable for PTP radios, then the full concept can be considered. A PMT only solution to attract only business users is feasible.

Semi-rural areas are mainly occupied by residential users. As the area is normally quite large compared to the capacity need, the PTP tier is not necessary). For last mile(s) access to residential customers, the AMT based approach is sufficient. If only higher capacity customers are served, then the solution is PMT.

Figure 6:
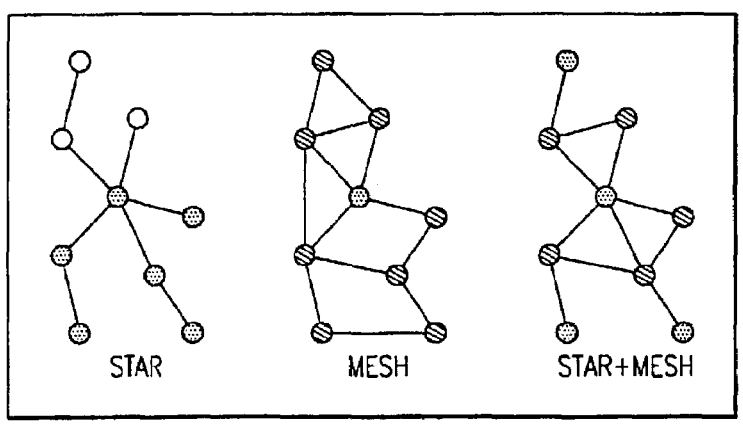
FIG. 6 shows rural network topologies.
Figure 7:
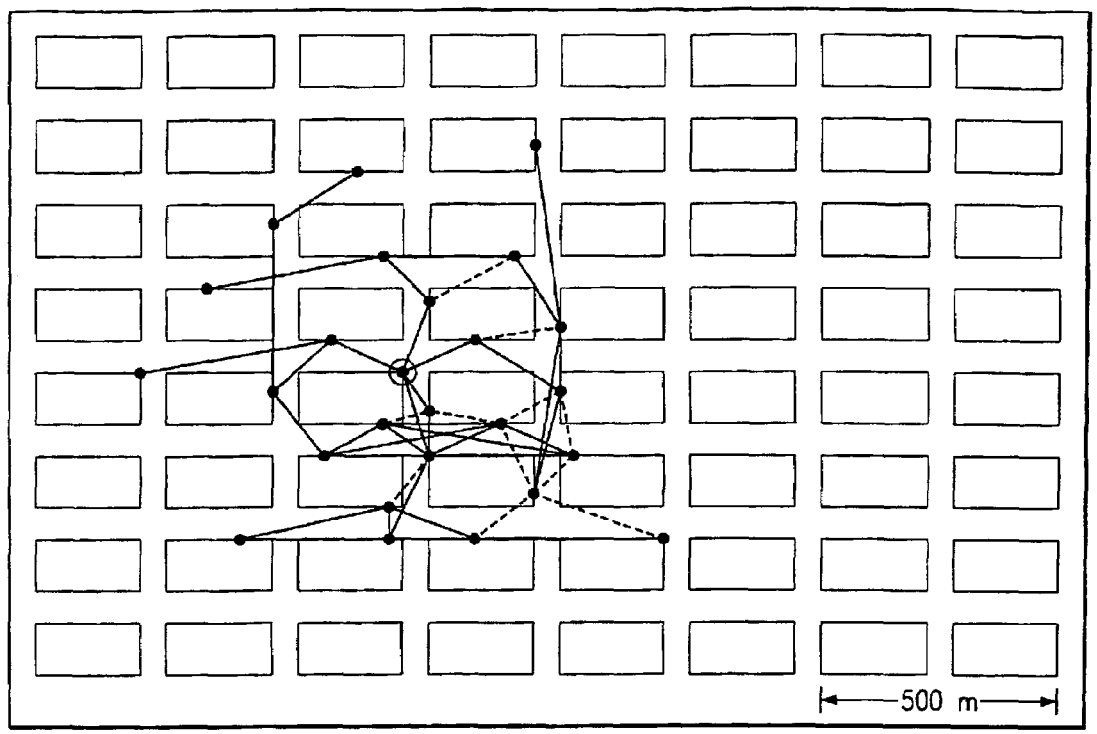
FIG. 7 shows an ad-hoc mesh network with 25 customers.
Figure 8:
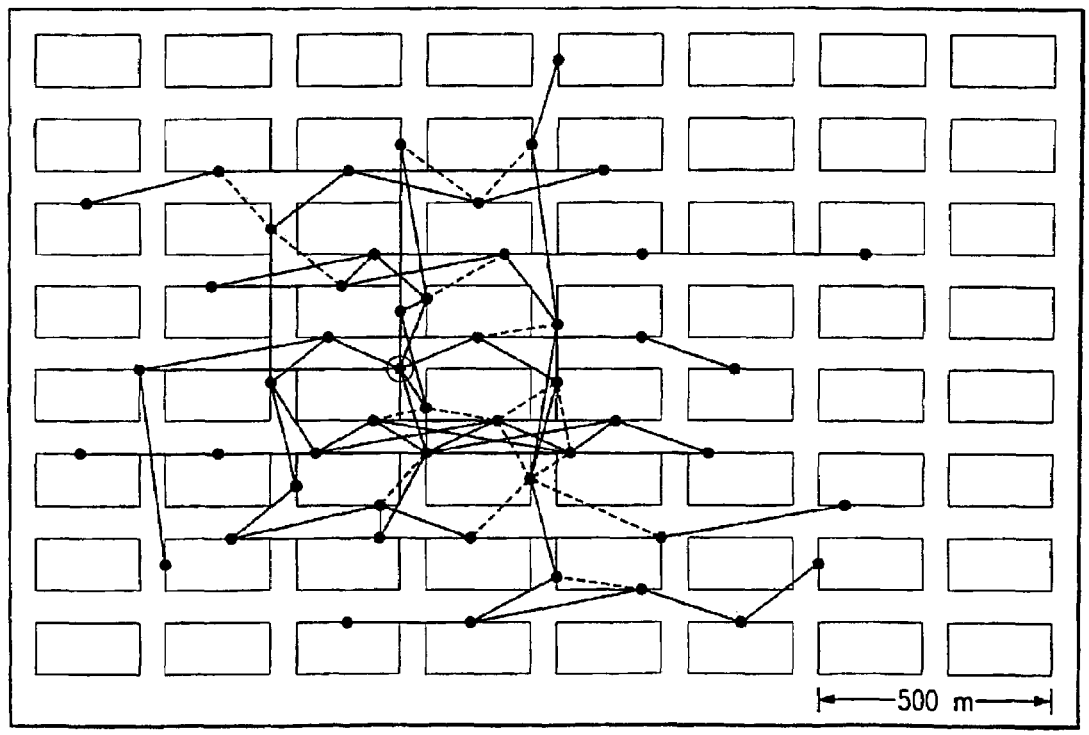
FIG. 8 shows an ad-hoc mesh network with 50 customers.
Figure 9:
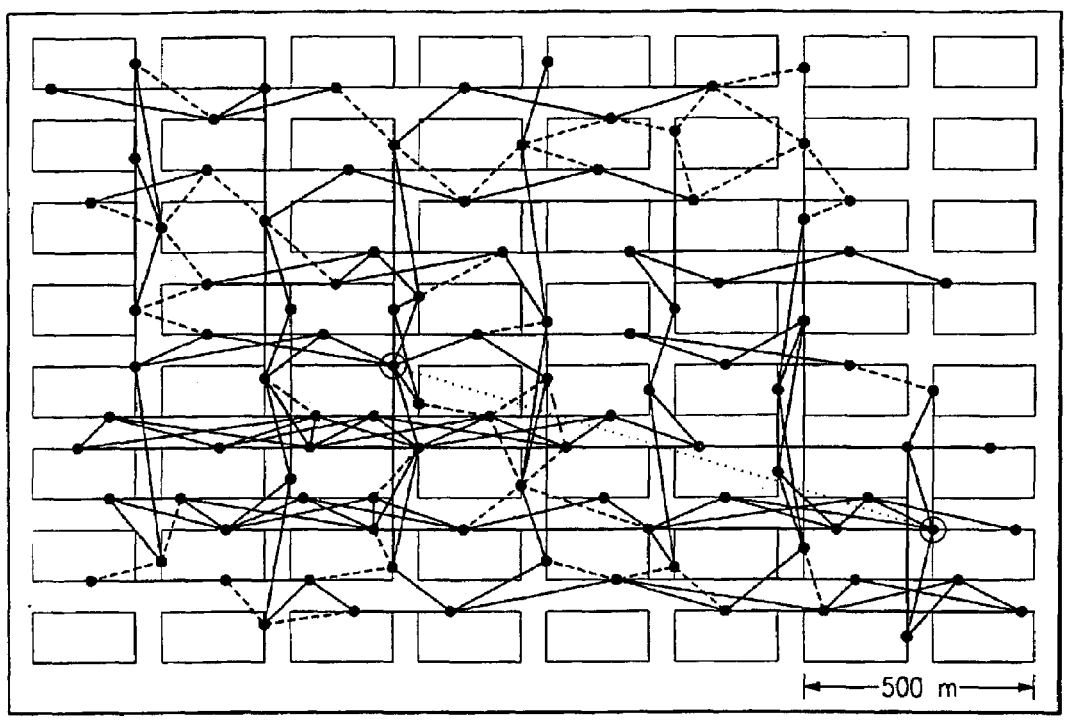
FIG. 9 shows an ad-hoc mesh network with 100 customers.
Figure 10:
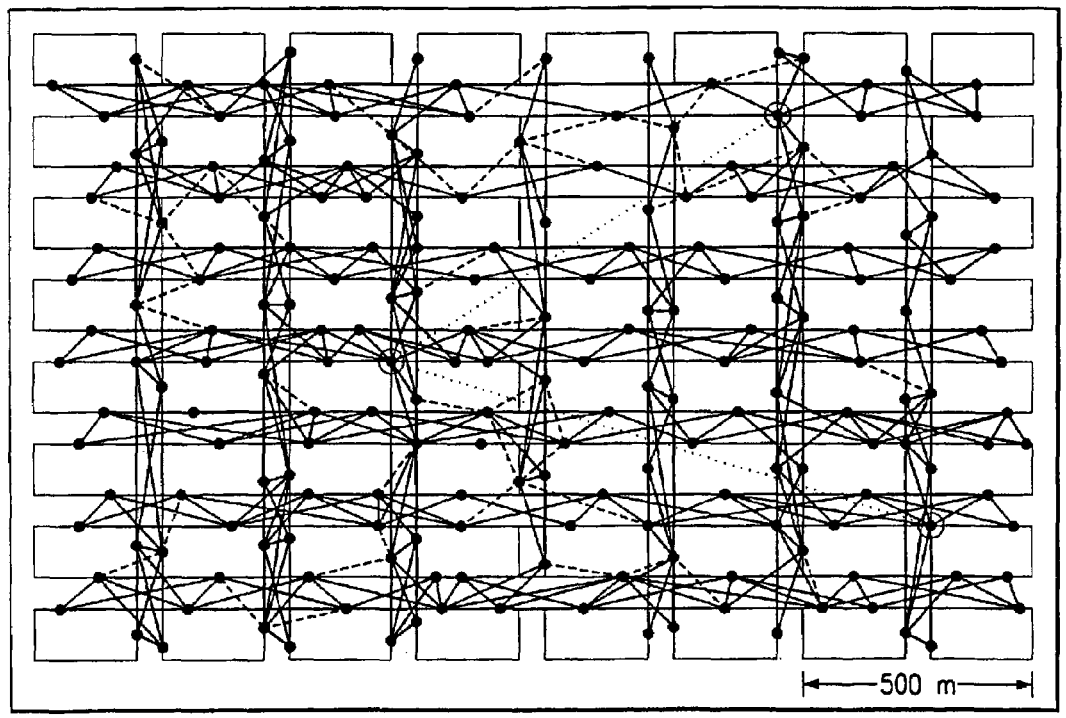
FIG. 10 shows a mesh network with 200 customers.

Rural areas have a very low customer density. A PMT is the most suitable. If cheaper radios are desired and lower throughput can be tolerated, then AMT radios with additional directional antennas can be used. The network topology here is fully dependent on particular case but could be a multi-leg star, simple mesh or a combination of these (see FIG. 6).

FIGS. 7 to 10 illustrate the deployment of the AMT in an urban environment. In this environment NLOS (dotted lines in the figures) operation is beneficial, helping to reach all potential customers. As the customer base and customer density grow after initial implementation, the need for NLOS operation gradually diminishes. At some level it may be that only LOS operation is considered. At this stage additional technology (e.g. 60 GHz radios) can be introduced.

With higher customer density the cell size decreases. This can be implemented by restricting constraints on power control so as to limit the transmission range of transceivers in the system. The transmit power is adjusted continually to the minimum required level for the information to get through with a required level of accuracy. This has an interference reducing effect. Nevertheless, performance may advantageously be strengthened by usage of space diversity (directional antennas). Traditional directional antennas are not preferred in the present case as beam direction must be adjusted according to the position of the other end of a radio link. Smart and semi-smart antennas will be preferred.

Directional antennas and an advanced frequency re-use scheme may be called upon when the LOS probability increases. In that case, not only does the end point lie within LOS, but also an increasing number of the other devices. This is a limiting factor to shrinking cells. Thus systems with worse propagation characteristics and more available bandwidth are foreseen. Even optical transmission can be considered at this point at least for the fixed installations.

Figure 11:
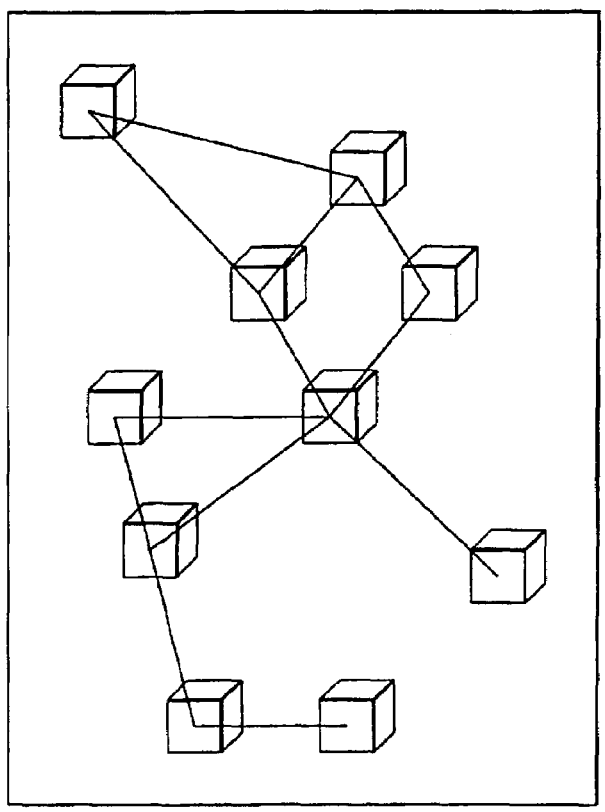
FIG. 11 shows a mesh network applied in a rural case.

In rural areas the customer density might be very low. There is a clear need for extended range. In this case the AMT can be deployed in a LOS manner (LOS is generally easily achieved in rural areas, and hence a weak constraint). This might call for locating fixed antennas on high constructions and even professional installation and alignment of the antennas. Optional very high gain directional antennas could be used to extend the range further. Nevertheless, the mesh functionality can be used when available creating redundant paths (see FIG. 11). Since the PMT should be capable of serving as sink tier for the AMT, the capacity of each PMT node should be (in a typical case for present level data throughputs) at least, say, 12.8 Mbps (matched to the 4 hop max. mesh case) or 20.0 Mbps (matched to the 5 hop max. mesh case). Hence, as a stand-alone application, the PMT will typically serve as the lowest tier of the backhaul network for businesses or apartment complexes, which have a private (wired or wireless) LAN, or as MAN to connect clusters of buildings like in university campuses.

Since entirely isolated networks are exceedingly rare, a PMT will, in practice, probably be provided with have sinks to wireless PTP nodes and/or wired network backbones.

A flexible increase in range by decreasing the throughput should enable usage of the PMT tier as primary tier to provide access for customers in (semi) rural areas.

The PTP Tier consists of high throughput (>100 Mbps) point-to-point links, which can serve as backbone network for the above PMT, and as access point for customers with very high data-rate demands or a combination thereof. The only feasible sinks for this tier are wired "internet backbones".

As with the PMT above, a tradeoff between throughput and range should be facilitated to allow effective usage in both high-density (urban) and low-density (rural) areas.

Deployment of the complete concept as shown in FIG. 3 will be most feasible in urban areas with either solely residential customers, or a mixture of residential and business customers. The AMT would then be deployed to facilitate low-cost connections to individual residences and businesses with low throughput needs, while the PMT would serve as sink tier for the AMT and to facilitate access for businesses with medium throughput demands. The PTP Tier in this case serves as backhaul tier for the PMT and to facilitate access for businesses with high throughput demands.

Some examples of potential spectrum allocations for the tiers of the system will now be set out.

The AMT could (in the USA) be implemented in the U-NII band (regulated in Part 15, Subpart E), which is assigned three slots of 100 MHz each at 5.15, 5.25 and 5.725 GHz respectively. If ISM band regulations are fulfilled, then an additional 50 MHz is available (5.725-5.875 GHz ISM). The lack of licensing in these bands would allow for fast, flexible deployment of devices.

AMT transmissions are made up of control slots and data slots (see below). The transmission of the control slots may be done in one of the channels in the highest band (due to the allowance of the highest power in this band), which can be selected arbitrarily by the operator. During the transmission of these control slots, all other channels will be silent. Data slots will be scheduled in the remaining time, spread out over all channels, where the scheduling will take the maximum allowed power in that channel into consideration.

The following table illustrates possible U-NII bands and power regulations for the example of implementation of the present system in the USA.

| Band (GHz) | Max. Output Power |
|---|---|
| 5.15-5.25 | 200 mW |
| 5.25-5.35 | 400 mW |
| 5.725-5.825 | 800 mW |

Figure 12:
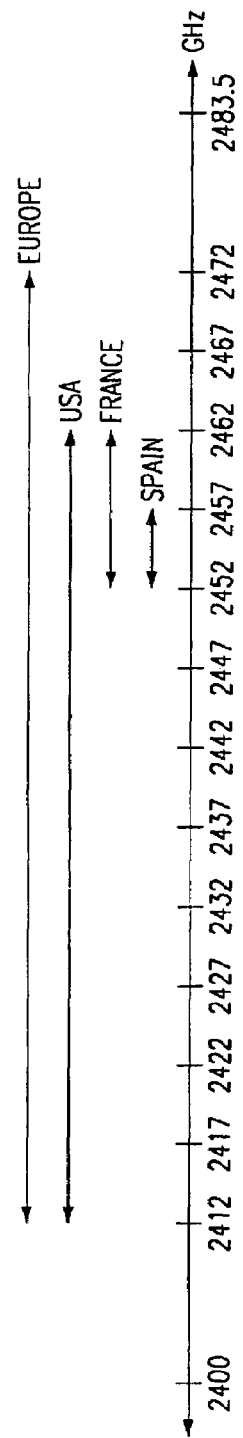
FIG. 12 shows IMS spectrum band allocation.

Alternatively, the AMT could be implemented in the 2.4-2.4835 GHz ISM band (see FIG. 12). This band requires a minimum 6 dB bandwidth of 500 kHz (see IEEE 802.16 System Requirements v4) and allows a peak output power of 1 Watt (omni-directional). WLAN standards (see IEEE Std 802.11-1999 and ETSI/BRAN HIPERLAN, Type 2 "Requirements and architectures for wireless broadband access", TR 101 031, v2.2.1) divide this band into either 13 (Europe) or 11 (USA) channels 5 MHz channels, although this is not a regulatory requirement. In situations where allocated spectrum is limited an adaptation of the presently described example system, with reduced spreading (requiring less bandwidth, but reducing the throughput) could be used.

Figure 13:
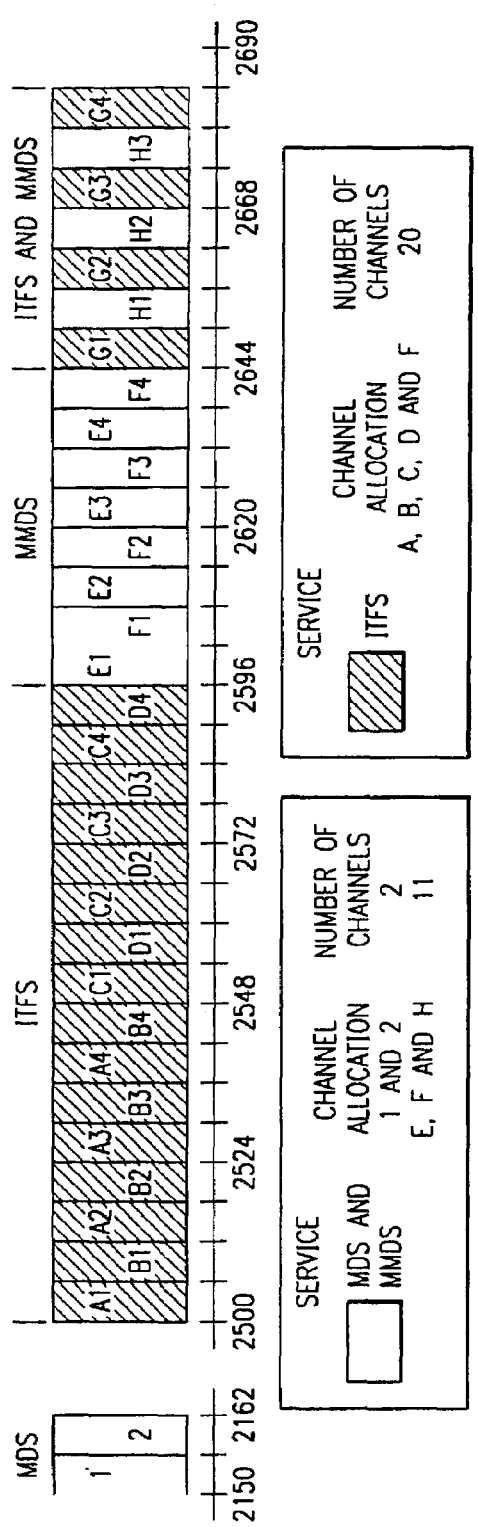
FIG. 13 shows MMDS bandwidth allocation for the example of the USA.

Another option would be deployment in the MMDS bands (see FIG. 13).

Figure 14:
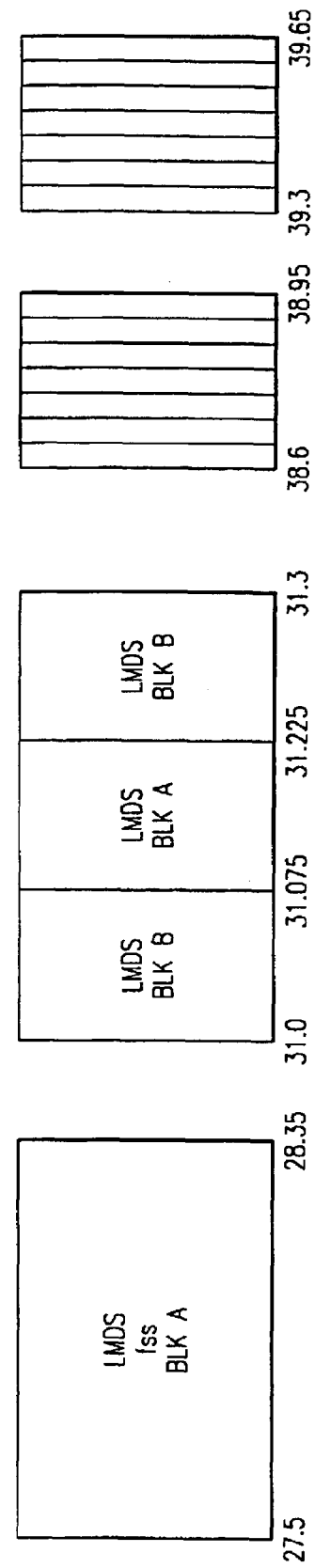
FIG. 14 shows LMDS bandwidth allocation for the example of the USA.

The PMT tier could be implemented in the LMDS bands, the allocation of which is shown in FIG. 14. These bands are regulated in Part 101, and require licensing.

The PTP Tier's optimum spectral location will heavily depend on the technology used. For example implementations on traditional microwave links and infrared are possible. PTP links generally require a license for each link separately, rather than licensing of a frequency band in a certain region.

ITU spectrum allocation recommendations for PTP systems are defined throughout the range of 1 GHz up to 57 GHz (see Rec. ITU-R F.746-4 Radio-Frequency Channel Arrangements for Radio-Relay Systems, 1999). The following equation defines the required channel bandwidth (B) for a certain bit rate (R):

$$B = \frac{(1+\alpha)R}{\log_2 M}$$

where α is the cosine roll-off factor (generally 0.2-0.5), R the bit rate and M the number of modulation levels. For example a 155 Mbit/s radio with 64-QAM would require a bandwidth of 40 MHz.

The PMT tier will preferably support the same transport protocols as the AMT tier.

The aim of the network management in the PMT is to allow the network operator to change any desired parameter or protocol functionality in any remote device without any onsite maintenance. For this purpose, all devices could be SNMP-compatible, and allow the operator to transfer new software into the device by FTP.

For this tier, the network management should allow the operator to conveniently add nodes, without too many manual settings. Even though the network does not adapt itself to new nodes, the NMS must be capable of determining which parameters to change in the surrounding devices.

Network management for this tier will be part of the overall network management functionality described below.

Unlike present LMDS systems, the PMT tier does not require a direct link (either physically direct or through a repeater) of each node to a sink, and is therefore more reliable and flexible. The increased reliability is the result of the link redundancy in a mesh topology.

In the present system the combination of the PMT with the AMT provides significant advantages. As last mile access can be handled with AMT radio links and apparatus, which can be implemented with cheaper RF technology and have no stringent LOS requirements, PMT radios can be provided less expensively and the network made easier to plan. This in turn enables more elaborate solutions than in pure LMDS systems, giving the PMT tier a performance and deployment advantage (i.e. higher range, throughput, interference resilience etc.) over LMDS solutions.

The purpose of the PTP Tier is to provide dedicated high capacity links. These may be viewed as being replacements for cable or fibre when that is supported by link economics. PTP radios might also assist operators who do not own their own wired infrastructure, or in cases where fast deployment is essential.

PTP Tier throughput in the present example system ranges from 155 Mbit/s and multiples thereof to 1 Gbit/s. Infra-red, radio or other wireless links can be used. A typical link range may be 500 m or less.

PTP Tier links can in practice be deployed one-by-one. It is preferred that licensed bands be used. Availability and reliability figures are likely to be equal to those of wired backbones.

Examples of radios that could be used (with modification) in the PTP tier are the Nokia PowerHopper (18 and 26 GHz) and the Nera NL290 (4-13 GHz).

Network management will preferably facilitate the following features:

Configuration management—with a configuration management protocol allowing the operator to set such parameters as IP addresses, RX/TX parameters etc.

Fault management—allowing the operator to access a device's error and warning logs, reset devices and shut down devices. The protocols will allow the operator to set various reporting levels and set the severity of errors to be reported to the central network management system.

Performance management—Performance management protocols in each device monitor the device's link quality. A device may be configured to report prolonged periods of unacceptable link quality to an operator's central management system. Such a feature is generally not desired for a AMT device, but very desirable for the PMT and PTP Tier devices.

Security management—Security management protocols will allow the operator to set keys in each device and to validate the key of each device. Each device should be able to validate access attempts.

Accounting management—Accounting management protocols may allow the operator to set the maximum throughput of traffic originating from the device. This could include limiting the bursty throughput as well as the total traffic.

Flow management—allowing the operator to force the direction of traffic, overruling the automatic routing protocols.

Upgrading management—The network can allow the operator to upgrade the software intone specific device by means of uni-cast, or in a group of devices by means of multi-cast.

All of the above features should preferably be available to an operator from a single NMS, and should be accessible while the device is operational (with exception of certain upgrading and fault management functions, which may interrupt the device's operation for a short duration).

It is envisaged that the network described herein will be predominantly used for transportation of "internet applications": both traditional flexible applications, such as FTP and web-browsing; and time-critical applications such as voice-over-IP and audio/video streaming. Applications which require IPSEC or like security, and multicast and broadcast applications may also be supported.

Significant advantages of the present system lie in its flexibility of adaptation and deployment of the network, as well as in the plurality of services that a provider can offer to its customers and the range of devices that can be connected.

The fact that the present system provides a flexible wireless solution for traffic concentrations up to at least 155 Mbps, and that the system reconfigures itself when new sinks are added, gives the service provider a flexible tool to match the bandwidth demands of its customers, and hence to scale up the network as desired. In contrast, a typical wired solution requires estimation of fixed capacity years ahead since capacity can only be increased with significant investment.

The relative flexibility of adaptation and scalability of the present system also give a service provider flexibility of deployment, since the provider can match his network to the current demand, and modify it easily and only when traffic-patterns change. This allows the provider to make a much lower initial investment than for a wired solution.

Since the CPE devices are principally intended for short-distance (wholly or semi-) LOS use, the cost of the RF part of a CPE of the present system can be kept fairly low. Also, since the basic access scheme is DSSS, but alternative high performance (and more expensive) schemes such as OFDM are optional, devices varying in performance and cost can be easily connected to the network, increasing the number of devices. On top of this, the AMT is intended for the ISM bands, for which the RF equipment is significantly cheaper than for the PMT devices, which may use the LMDS bands. Hence the hierarchical layering of the proposed system can reduce costs compared to a pure LMDS-band based network.

The design of the present system inherently allows a service provider to offer a wide variety of service packages. Not only because user priorities allow the provider to assign preferred customers and flexible maximum bandwidth, but also because the full system concept consists of three natural tiers of services. This allows the provider to not only have small-demand customers connect to the AMT, but also to have larger-demand customers connect to the PMT or even PTP tier, without changing the functionality of the system.

Due to connection redundancy, the present system is likely to be more tolerant of link failure than, for example, star and tree networks. When a link breaks, a device in the present system can reroute its traffic over its other links. Even a sink-node failure will not result in loss of connectivity, as the traffic can (though with lower efficiency) be redirected to another sink-node.

Networks that rely on CSMA or similar contention-based access protocols tend to break down or deliver drastically lower throughput as the number of active devices grows large. This is due to the increased probability of collisions and the back-off mechanisms. The proposed network however does not suffer from such effects as reservation mechanisms are used. Even when the number of devices grows large compared to the number of control-slots available in a superframe, redefinition of the superframe size in the present system could readily allow for more control-slots and hence facilitate access for more devices. On the other hand, when few devices are present, the superframe could be defined to be smaller, so as not to waste resources.

Reliability can be further enhanced provided by the modulation agility, which would allow a device to switch to modulations less sensitive to interference if necessary, while it enables selecting high throughput modulations when the link-quality is sufficient.

Additional reliability may be provided by using an FFT engine (which may in any event be provided for use with OFDM implementation) for spectral analysis to detect and avoid channels with high interference.

The higher tiers of the present system may call for a relatively large amount of bandwidth, which is only available in high frequency ranges where propagation loss is generally severe. This may limit the range of such higher-tier links. Care should thus be taken in designing the system since the higher tiers must span over the lower tiers mandating somewhat longer link-lengths. This issue is less pertinent when the AMT is dense, as the sinks, and thus the nodes of the tiers above it, lie closer together.

Care should also be taken to handle any delays that may arise. For example, due to the multi-tier and (in the mesh tiers) multi-hop solution, CPE-POP delay in the present system may be larger compared to a single-tier network (which however requires significantly more wiring). Also, due to the adaptive routing in the AMT, the number of hops between two nodes may change, making estimation of the peer-to-peer delay difficult.

It may be envisaged that the present system may be further enhanced by:
(i) The use of hybrid ARQ;
(ii) Antenna diversity, adjustable antenna lobe direction, smart antennas, a semi-smart antenna concept or the like;
(iii) The use of a PMT protocol that takes advantage of the fixed aspect of the network (especially when narrowbeam antennas are used and multicast from nodes is not possible).
(iv) The use of a scheme with semi-randomised slot locations to avoid subs harmonics (for example with period equal to the frame length).

The following abbreviations are used herein:

| | |
|---|---|
| AGC | Adaptive Gain Control |
| AMT | Ad-Hoc Mesh Tier |
| ARP | Address Resolution Protocol |
| BRAN | Broadband Radio Access Networks |
| CCITT | International Telegraph and Telephone Consultative Committee |
| CCA | Carrier Controlled Access |
| CCK | Complementary Code Keying |
| CPE | Customer Premise Equipment |
| CRC | Cyclic Redundancy Code |
| CSMA | Carrier Sense Multiple Access |
| DSSS | Direct Sequence Spread Spectrum |
| DSL | Digital Subscriber Line |
| ETSI | European Telecommunication Standardization Institute |
| FCC | Federal Communications Commission (USA) |
| FFT | Fast Fourier Transform |
| ICMP | Internet Control Message Protocol |
| IP | Internet Protocol |
| IPSEC | Secure Internet Protocol |
| ISDN | Integrated Services Digital Network |
| ISM | Industry, Science & Medical |
| ISP | Internet Service Provider |
| ITU | International Telecommunication Union |
| LAN | Local Area Network |
| LMDS | Local Multipoint Distribution Service |
| LOS | Line Of Sight |
| MAN | Metropolitan Access Network |
| MMDS | Multi Media Distribution System |
| NLOS | Non Line Of Sight |
| NMS | Network Management System |
| OFDM | Orthogonal Frequency Division Modulation |
| PAN | Personal Access Network |
| PMT | Pre-configured Mesh Tier |
| PMP | Point-to-Multi-Point |
| POP | Point of Presence |
| PPP | Point to Point Protocol |
| PTP | Point-to-Point |
| QAM | Quadrature Amplitude Modulation |
| QoS | Quality of Service |
| RF | Radio Frequency |
| RIP | Router Information Protocol |
| RX | Receive |
| SLIP | Serial Line Internet Protocol |
| SNMP | Simple Network Management Protocol |
| SOHO | Small Office Home Office |
| TCP | Transmission Control Protocol |
| TFTP | Trivial File Transfer Protocol |
| TX | Transmit |
| UDP | User Datagram Protocol |
| U-NII | Unlicensed National Information Infrastructure |
| WLAN | Wireless Local Access Network |
| WLL | Wireless Local Loop |

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

The invention claimed is:

1. A communications system comprising: a hierachical mesh network comprising at least a first mesh network tier and a second mesh network tier:
the first mesh network tier comprising a plurality of first mesh network tier subscriber units and a first mesh network tier sink node unit configured to wirelessly communicate with the first mesh network tier subscriber units; and
the second mesh network tier geographically at least partly overlapping the first mesh network tier and comprising a plurality of second mesh network tier subscriber units and a second mesh network tier sink node unit configured to wirelessly communicate with the second mesh network tier subscriber units over a fixed network, wherein at least one of the first mesh network tier subscriber units is not a member of the second mesh network tier, and wherein at least one of the second mesh network tier subscriber units is not a member of the first mesh network tier; and a dedicated connection between the first mesh network tier sink node unit and a second mesh network tier unit configured to communicate in the second mesh network tier, whereby one of the first mesh network tier subscriber units is configured to be provided with a communication path via the first mesh network tier sink node unit to said second mesh network tier unit.

2. A communications system as claimed in claim 1, wherein wireless communication in the first mesh network tier is independent of wireless communication in the second mesh network tier.

3. A communications system as claimed in claim 2, wherein wireless communication in the first mesh network tier is in a different frequency band from wireless communication in the second mesh network tier.

4. A communications system as claimed in claim 3, wherein the first mesh network tier comprises a plurality of first mesh network tier sink node units with which the first mesh network tier subscriber units are configured to wirelessly communicate.

5. A communications system as claimed in claim 4, comprising a plurality of connections, each connection being between a respective first mesh network tier sink node unit and a respective second mesh network tier unit whereby one of the first mesh network tier subscriber units is configured to be provided with a communication path via the respective first mesh network tier sink node to the respective second mesh network tier unit.

6. A communications system as claimed in claim 5, comprising:

a third mesh network tier geographically overlapping the second mesh network tier and comprising a plurality of third mesh network tier subscriber units and a third mesh network tier sink node unit configured to wirelessly communicate with the third mesh network tier subscriber unit; and a dedicated connection between the second mesh network tier sink node unit and a third mesh network tier unit configured to communicate in the third mesh network tier, whereby one of the second mesh network tier subscriber units is configured to be provided with a communication path via the second mesh network tier sink node unit to another third mesh network tier unit.

7. A communications system as claimed in claim 6, wherein wireless communication in the first mesh network tier and in the second mesh network tier is independent of wireless communication in the third mesh network tier.

8. A communications system as claimed in claim 7, wherein wireless communication in the first mesh network tier and in the second mesh network tier is in a different frequency band from wireless communication in the third mesh network tier.

9. A communications system as claimed in claim 8, wherein the second mesh network tier comprises a plurality of second mesh network tier sink node units with which the second mesh network tier subscriber units are configured to wirelessly communicate.

10. A communications system as claimed in claim 9, comprising a plurality of a connections, each connection being between a respective second mesh network tier sink node unit and a respective third mesh network tier unit whereby one of the second mesh network tier subscriber units is configured to be provided with a communication path via the respective second mesh network tier sink node to a respective third mesh network tier unit.

11. A communications system as claimed in claim 1, wherein the said communication is data communication.

12. A communications system as claimed in claim 11, wherein the said communication is packet data communication.

13. A communications system as claimed in claim 1, wherein the said communication uses an internet protocol.

14. A communications system as claimed in claim 1, wherein the said communication in the first mesh network tier is radio communication.

15. A communications system as claimed in claim 1, wherein the said communication in the second mesh network tier is radio communication.

16. A communications system as claimed in claim 7, wherein the said communication in the third mesh network tier is radio communication.

17. A communications unit comprising a first mesh network tier sink node unit comprising a first transceiver configured to wirelessly communicate with at least one of a plurality of first mesh network tier subscriber units in a first mesh network tier, and a second transceiver configured to communicate in a dedicated connection to a second mesh network tier subscriber unit configured to wirelessly communicate in a second mesh network tier, the second mesh network tier being a fixed network, wherein the second mesh network tier geographically overlaps the first mesh network tier wherein the communications unit is configured to provide a communications path between one of the first mesh network tier subscriber units and the second mesh network tier subscriber unit, wherein at least one of the first mesh network tier subscriber units is not a member of the second mesh network tier, and wherein the second mesh network tier comprises at least one second mesh network tier subscriber unit that is not a member of the first mesh network tier.

18. A method comprising:

providing a wireless communications path between a first mesh network tier sink node unit and at least one of a plurality of first mesh network tier subscriber units in a first mesh network tier;

providing a dedicated communications path between the first mesh network tier sink node and a first second mesh network tier subscriber unit in a second mesh network tier, the second mesh network tier being a fixed network, wherein at least one of the first mesh network tier subscriber units is not a member of the second mesh network tier, and wherein the second mesh network tier comprises at least one second mesh network tier subscriber unit that is not a member of the first mesh network tier, wherein the second mesh network tier geographically overlaps the first mesh network tier; and providing the at least one of the first mesh network tier subscriber units with a communication path to the first second mesh network tier subscriber unit via the first mesh network tier sink node.

19. An apparatus for operation in a communications system comprising at least a first mesh network tier and a second mesh network tier, the second mesh network tier geographically at least partly overlapping the first mesh network tier and comprising a second sink node and a plurality of second communication terminals configured to wirelessly communicate with the second sink node, the apparatus comprising at least one transceiver, the apparatus configured with the assistance of the at least one transceiver to:

operate as a first sink node configured to be in wireless communication with a plurality of first mesh network tier communication terminals; and operate as a second communication terminal for providing one of the first mesh network tier communication terminals with communications access to the second mesh network tier, and wherein one of the first mesh network tier or the second mesh network tier is a fixed network mesh tier, and wherein at least one of the first mesh network tier communication terminals is not a member of the second mesh network tier, and wherein the second mesh network tier comprises at least one second mesh network tier communication terminal that is not a member of the first mesh network tier.

20. An apparatus as claimed in claim 19, wherein wireless communication in the first mesh network tier is independent of wireless communication in the second mesh network tier.

21. An apparatus as claimed in claim 20, wherein wireless communication in the first mesh network tier is in a different frequency band from wireless communication in the second mesh network tier.

22. An apparatus as claimed in claim 21, wherein the first mesh network tier further comprises a plurality of first mesh network tier sink node units with which the first communication terminals are configured to wirelessly communicate.

23. An apparatus as claimed in claim 22, wherein the communications system comprises a plurality of connections, each connection being between a respective first mesh network tier sink node unit and a respective second mesh network tier unit whereby one of the first mesh network tier communication terminals is configured to be provided with a communications access via the respective first mesh network tier sink node unit to the second mesh network tier.

24. An apparatus as claimed in claim 23, wherein the communications system comprises:
  a third mesh network tier geographically at least overlapping the second mesh network tier and comprising a plurality of third mesh network tier communication terminals and a third mesh network tier sink node unit configured to wirelessly communicate with the third mesh network tier communication terminals; and
  a connection between a second mesh network tier sink node unit and a third mesh network tier unit configured to communicate in the third mesh network tier, whereby one of the second mesh network tier communication terminals is configured to be provided with communications access via the second mesh network tier sink node unit to the third mesh network tier.

25. An apparatus as claimed in claim 24, wherein wireless communication in the first mesh network tier and in the second mesh network tier is independent of wireless communication in the third mesh network tier.

26. An apparatus as claimed in claim 25, wherein wireless communication in the first mesh network tier and in the second mesh network tier is in a different frequency band from wireless communication in the third mesh network tier.

27. An apparatus as claimed in claim 26, wherein the second mesh network tier comprises a plurality of second mesh network tier sink node units with which the second mesh network tier communication terminals are configured to wirelessly communicate.

28. An apparatus as claimed in claim 27, comprising a plurality of a connections, each connection being between a respective second mesh network tier sink node unit and a respective third mesh network tier unit whereby one of the second mesh network tier communication terminals is configured to be provided with a communications access via the respective second mesh network tier sink node unit to the third mesh network tier.

29. An apparatus as claimed in claim 28, wherein the said communication is data communication.

30. An apparatus as claimed in claim 29, wherein the said communication is packet data communication.

31. An apparatus as claimed in claim 19, wherein the said communication uses an internet protocol.

32. An apparatus as claimed in claim 19, wherein the said communication in the first mesh network tier is radio communication.

33. An apparatus as claimed in claim 19, wherein the said communication in the second mesh network tier is radio communication.

34. An apparatus as claimed in claim 25, wherein the said communication in the third mesh network tier is radio communication.

35. A communications unit as claimed in claim 17, configured to wirelessly communicate in the first mesh network tier independently of wirelessly communicating in the second mesh network tier.

36. A communications unit as claimed in claim 35, configured to wirelessly communicate in the first mesh network tier at a different frequency band from the second mesh network tier.

37. A communications unit as claimed in claim 17, configured to wirelessly communicate data.

38. A communications unit as claimed in claim 37, the wireless data communication being packet data communication.

39. A communications unit as claimed in claim 17, configured to communicate using an internet protocol.

40. A communications unit as claimed in claim 17, configured to communicate in the first mesh network tier using radio communication.

41. A communications unit as claimed in claim 17, configured to communicate in the second mesh network tier using radio communication.

* * * * *

UNITED STATES PATENT AND TRADEMARK OFFICE
CERTIFICATE OF CORRECTION

PATENT NO.        : 7,664,049 B1                                           Page 1 of 1
APPLICATION NO. : 10/089326
DATED             : February 16, 2010
INVENTOR(S)       : Arrakoski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1387 days.

Signed and Sealed this

Thirtieth Day of November, 2010

David J. Kappos
*Director of the United States Patent and Trademark Office*